United States Patent
Weston

(10) Patent No.: US 9,429,497 B2
(45) Date of Patent: Aug. 30, 2016

(54) SYSTEM AND METHOD FOR DETERMINING TIRE UNIFORMITY PARAMETERS FROM PIEZOELECTRIC MEASUREMENTS IN THE TIRE COUNTER-DEFLECTION ZONE

(75) Inventor: David Alan Weston, Hendersonville, NC (US)

(73) Assignees: MICHELIN RECHERCHE et TECHNIQUE S.A., Granges-Paccot (CH); COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 171 days.

(21) Appl. No.: 14/304,133

(22) PCT Filed: Dec. 29, 2011

(86) PCT No.: PCT/US2011/067844
§ 371 (c)(1),
(2), (4) Date: Jun. 13, 2014

(87) PCT Pub. No.: WO2013/101064
PCT Pub. Date: Jul. 4, 2013

(65) Prior Publication Data
US 2014/0326062 A1    Nov. 6, 2014

(51) Int. Cl.
*G01M 17/02* (2006.01)
*G01L 5/16* (2006.01)
*B60C 23/04* (2006.01)
*B60C 23/06* (2006.01)

(52) U.S. Cl.
CPC .......... *G01M 17/02* (2013.01); *B60C 23/0493* (2013.01); *B60C 23/064* (2013.01); *G01L 5/167* (2013.01); *B60C 2019/004* (2013.04)

(58) Field of Classification Search
None
See application file for complete search history.

(56) References Cited

U.S. PATENT DOCUMENTS

| | | | |
|---|---|---|---|
| 6,609,074 B2 | 8/2003 | Shteinhauz | |
| 7,082,816 B2 | 8/2006 | Zhu | |
| 7,415,874 B2 | 8/2008 | Mancosu et al. | |
| 2004/0158441 A1 | 8/2004 | Bertrand | |
| 2005/0274176 A1* | 12/2005 | Thiesen | B60C 23/0411 73/146 |
| 2006/0090835 A1* | 5/2006 | Mancosu | B60C 23/04 156/110.1 |
| 2007/0255510 A1* | 11/2007 | Mancosu | B60T 8/172 702/34 |
| 2008/0035259 A1* | 2/2008 | Mancosu | B29D 30/0662 152/246 |
| 2010/0179724 A1 | 7/2010 | Weston | |
| 2010/0191409 A1 | 7/2010 | Weston | |
| 2010/0274447 A1* | 10/2010 | Stumpf | G01D 1/00 701/36 |

OTHER PUBLICATIONS

PCT International Search Report for PCT/US2011/067844, dated Mar. 14, 2012.

* cited by examiner

*Primary Examiner* — Andre Allen
(74) *Attorney, Agent, or Firm* — Dority & Manning, P.A.

(57) ABSTRACT

Systems and methods of determining tire uniformity parameters from piezoelectric tire sensor output signals obtained while operating in the counter-deflection zone include establishing a transfer function that relates a tire uniformity parameter to the piezoelectric output signals. Piezoelectric output signals from two or more piezoelectric tire sensors are then monitored to measure the voltage change from each piezoelectric tire sensor while it is operating in the counter-deflection zone. These output signals are correlated, and an actual tire uniformity parameter value is determined by applying the measured and correlated piezoelectric output signal voltage change levels to the established transfer function. Actual tire uniformity values are ultimately provided as electronic output to a user.

8 Claims, 6 Drawing Sheets

SYSTEM AND METHOD FOR DETERMINING TIRE UNIFORMITY PARAMETERS FROM PIEZOELECTRIC MEASUREMENTS IN THE TIRE COUNTER-DEFLECTION ZONE

FIELD OF THE INVENTION

The present subject matter generally relates to tire sensors and related tire electronics, and more particularly concerns a piezoelectric-based system and method for determining tire uniformity parameters from piezoelectric measurements in the tire counter-deflection zone.

BACKGROUND OF THE INVENTION

The incorporation of electronic devices with pneumatic tire structures yields many practical advantages. Tire electronics may include sensors and other components for obtaining information regarding various physical parameters of a tire, such as temperature, pressure, number of tire revolutions, vehicle speed, etc. Such performance information may become useful in tire monitoring and warning systems, and may have potential use as a part of a feedback system to regulate or control certain tire and/or vehicle related systems. Yet another potential capability offered by electronics systems integrated with tire structures corresponds to asset tracking and performance characterization for commercial vehicular applications.

Sensors using piezoelectric-based technology have been used in various tire embodiments for a variety of purposes. For example, piezoelectric elements have been used to generate power within a tire. Piezoelectric sensors have been used to function as a revolution counter within a tire. Piezoelectric sensors have even been used to determine deflection, load, acceleration and other parameters.

One important parameter of interest related to tire performance is the tire force variation, a tire property that characterizes the dynamic behavior of the forces it experiences in radial, lateral or fore-aft directions. Radial force variation is often of primary interest in tire analysis as it provides a quantifiable indication of tire uniformity. Both high speed and low speed tire uniformity indicators have proven useful in characterizing the performance and ride comfort afforded by particular tires. As such, it may be desirable to monitor tire force variation levels associated with a tire to make sure that a tire does not exceed desired threshold limits or other defined standards for a tire. In addition, tire force variation levels may be monitored to determine other features related to tire uniformity, including but not limited to tire stiffness, thickness variation, radial run out and other geometric tire parameters.

Although many piezo-based tire sensors have been employed, a need remains for a robust and reliable piezo-based system and method for determining tire uniformity parameters such as tire force variation and others from piezoelectric measurements in the tire counter-deflection zone. No known design has emerged that generally encompasses all of the desired characteristics as hereafter presented in accordance with the subject technology.

SUMMARY OF THE INVENTION

In view of the recognized features encountered in the prior art and addressed by the present subject matter, improved technology has been developed to determine tire uniformity parameters from piezoelectric measurements in the tire counter-deflection zone.

One exemplary embodiment of the disclosed technology concerns a method for determining tire uniformity values from piezoelectric tire sensor outputs. In accordance with such method, a transfer function relating a tire uniformity parameter to a piezoelectric output signal for a given tire is electronically established. The piezoelectric output signal from two or more piezoelectric tire sensors is monitored to measure the voltage change from each piezoelectric tire sensor while it is operating in the counter-deflection zone. The counter-deflection zone comprises an area of the tire that is not in contact with a ground surface. The piezoelectric output signals from each one of the two or more piezoelectric tire sensors are correlated. The actual tire uniformity parameter value is electronically determined by applying the measured and correlated piezoelectric output signal voltage change levels to the established transfer function, and the determined values are provided as electronic output.

Another exemplary embodiment of the disclosed technology concerns a piezoelectric system for determining tire uniformity parameter values for a given tire. Such piezoelectric system generally includes two or more piezoelectric tire sensors, a memory, a microprocessor and an optional output device. The two or more piezoelectric sensors are configured to generate piezoelectric output signals indicative of tire deformation as the tire is rolling along a ground surface and supporting a load. The memory stores a transfer function that relates a tire uniformity parameter to a piezoelectric output signal for a given tire. The microprocessor receives and correlates the piezoelectric output signals from each piezoelectric tire sensor, and electronically determines the actual tire uniformity parameter value by applying the measured and correlated piezoelectric output signal voltage change levels to the transfer function stored in memory. The optional output device relays the determined actual tire uniformity parameter value as electronic output to a user (e.g., audio and/or visual output or control signal outputs).

Still further embodiments of the disclosed technology concern non-transitory computer-readable media comprising instructions that when executed perform a method as set forth in one or more of the disclosed embodiments herein.

Additional embodiments of the present subject matter, not necessarily expressed in the summarized section, may include and incorporate various combinations of aspects of features, components, or steps referenced in the summarized embodiments above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
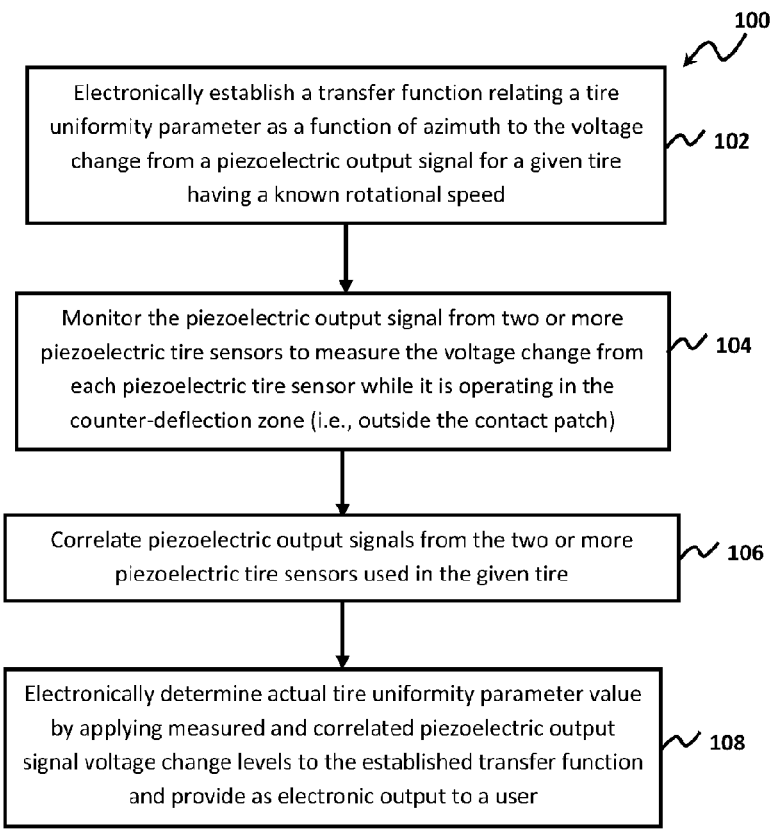
FIG. 1 provides a flow chart of exemplary steps in a method of determining one or more tire uniformity parameters from the voltage output signal of a piezoelectric tire sensor.

Repeat use of reference characters throughout the present specification and appended drawings is intended to represent same or analogous features, elements or steps of the present invention.

DETAILED DESCRIPTION OF THE PREFERRED EMBODIMENTS

As discussed in the Summary of the Invention section, the present subject matter is generally concerned with features and steps for determining tire uniformity parameters from voltage changes in a piezoelectric output signal. In more particular embodiments, tire uniformity parameters such as but not limited to radial run out, uneven mass distribution and radial force variation are determined from tire parameters including voltage levels measured from one or more piezoelectric sensors while operating in the counter-deflection zone. The tire parameters may be measured and/or calculated from piezoelectric-based sensors and/or other sensors incorporated in the tire, which then can be relayed to a remote location.

Selected combinations of aspects of the disclosed technology correspond to a plurality of different embodiments of the present invention. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Referring now to the drawings, FIG. 1 provides a flow chart of exemplary steps in a method 100 of determining tire uniformity parameters based on measured voltage levels from a piezoelectric tire sensor operating in a tire's counter-deflection zone. A first exemplary step 102 in method 100 involves electronically establishing a transfer function that relates one or more selected tire uniformity parameters as a function of azimuth around the radial circumference of a tire to the voltage change from a piezoelectric output signal. The different types of tire uniformity parameters that may be identified for determination in accordance with the disclosed techniques may vary. Non-limiting examples include dimensional or geometric variations (radial run out (RRO) and lateral run out (LRO)), mass variation or uneven mass distribution, and rolling force variations (radial force variation, lateral force variation and tangential force variation, sometimes also called longitudinal or fore and aft force variation).

A transfer function as established in step 102 may be developed by operating a given tire at a known rotational speed and then capturing the piezoelectric output signal(s) from one or more piezoelectric tire sensors placed within the tire. The tire uniformity parameter of interest can also be measured over several rotations of the tire such that a reliable model can be created to define a transfer function that relates the piezoelectric output voltage versus time to the tire uniformity parameter versus azimuth around the tire. Once this transfer function is known, later piezoelectric output signals can be used to dynamically determine tire non-uniformities present in other operational circumstances associated with the tire.

Referring still to FIG. 1, a next step 104 in method 100 involves monitoring the piezoelectric output signal from two or more piezoelectric tire sensors to measure the voltage change from each piezoelectric tire sensor while it is operating in the counter-deflection zone. In general, the counter-deflection zone is that portion of the tire that is outside the contact patch. In other words, the counter-deflection zone (cdZone) is that area of a tire that is not in contact with a ground surface, and the contact patch zone (cpZone) is that area of a tire that is in contact with a ground surface during operation. As such, for each revolution of a tire a piezoelectric sensor will obtain measurements for a portion of time while the sensor is within the contact patch and for a generally longer portion of time while the sensor is outside the contact patch and in the counter-deflection zone.

Measurement of signals from a piezoelectric sensor that is operating in the counter-deflection zone is useful because of the sensor's responsiveness to identification of tire perturbations, forces or other uniformity variations experienced by the tire. Each sensor is capable of transducing the local time-varying shape of the tire curvature along the tire surface to which the sensor is mounted (e.g., the inner liner or other attachment interface) to a proportional voltage. Changes in tire shape as the tire is rolling along a ground surface or simulated road-wheel are evident in the monitored output signal obtained while the piezoelectric signal is in the counter-deflection zone.

Figure 5:
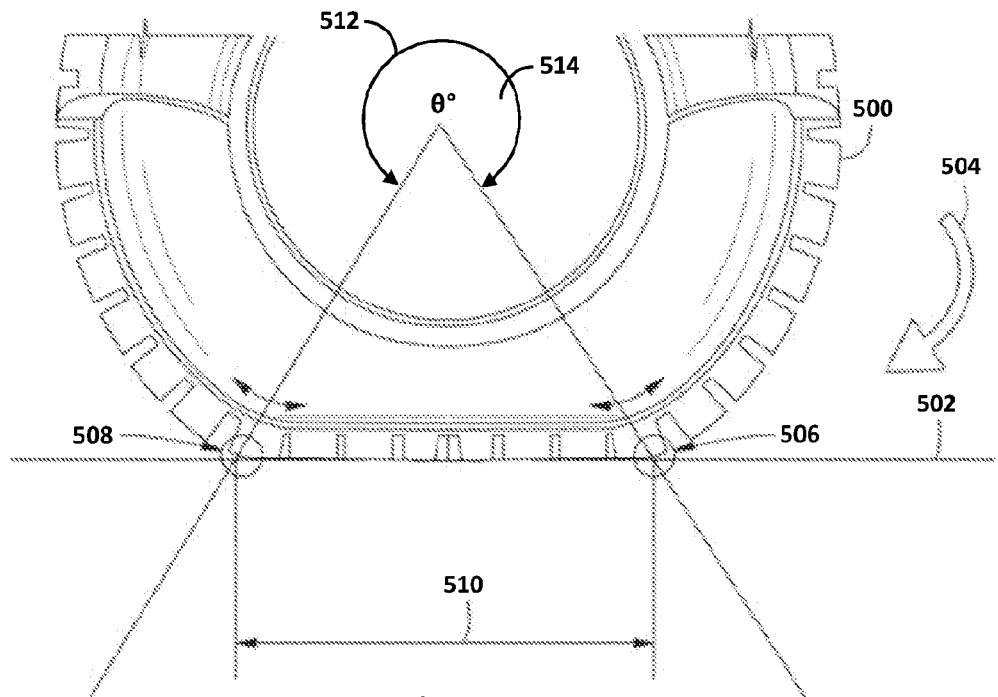
FIG. 5 illustrates a profile view of an exemplary tire portion, including aspects of a counter-deflection zone that may be used to measure various tire uniformity parameters in accordance with the disclosed system and method.
Figure 6:
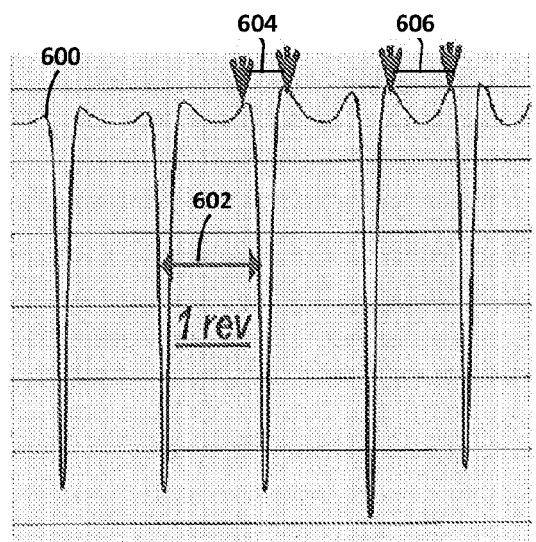
FIG. 6 provides an exemplary graphical representation of a piezoelectric output signal from a piezoelectric sensor used in an in-tire module (ITM), illustrating the general differences between signal portions obtained while the sensor is in the contact patch zone (cpZone) and counter-deflection zone (cdZone)

Additional aspects defining the tire counter-deflection zone and contact patch zone can be appreciated from FIGS. 5 and 6. Referring to FIG. 5, consider that a tire 500 is rolling along a ground surface 502 in the clockwise direction as indicated by directional arrow 504. A piezoelectric sensor positioned within tire 500 can effectively determine when the sensor enters the contact patch, corresponding to contact patch entry location (cpEntry) at location 506. Similarly, a piezoelectric sensor can also effectively determine when the sensor exits the contact patch, corresponding to contact patch exit location (cpExit) at location 508. The time during which a sensor operates within a contact patch zone (cpTime(i)) for the $i^{th}$ revolution of a tire, as represented by span 510, can thus be determined as the difference between the contact patch entry and exit times for a given tire revolution, i.e., $t_{cpTime(i)} = t_{cpExit(i)} - t_{cpEntry(i)}$. The time during which a sensor operates within a counter-deflection zone (cdTime(i)) for the $i^{th}$ revolution of a tire, as represented by span 512, can thus be determined as the time difference between a given contact patch exit time and the contact patch entry time for the next tire revolution, i.e., $t_{cdTime(i)} = t_{cpEntry(i+1)} - t_{cpExit(i)}$. Another meaningful representation of the time a given piezoelectric sensor spends in the counter-deflection zone corresponds to the counter-deflection zone angle (cdAngle=θ) represented as quantity 514 in FIG. 5.

The time variables discussed above (e.g., contact patch entry and exit times) used in some embodiments to help determine the time during which a piezoelectric tire sensor is operating in the counter-deflection zone may be determined by analyzing the raw piezoelectric signal directly. An example of such a raw signal 600 is shown in FIG. 6, in which signal span 602 represents one tire revolution, signal span 604 represents an exemplary portion of a tire revolution during which the sensor is operating in the contact patch zone, and signal span 606 represents an exemplary portion of a tire revolution during which the sensor is operating in the counter-deflection zone. In another example, a determination of such parameters may be made by taking a first derivative of the piezoelectric signal 600 and analyzing such first derivative to determine local maximum and minimum values. In another example, a determination of such parameters may be made by taking a second derivative of the piezoelectric signal 600 and analyzing such second derivative to determine zero crossings within the second derivative.

Figure 2:
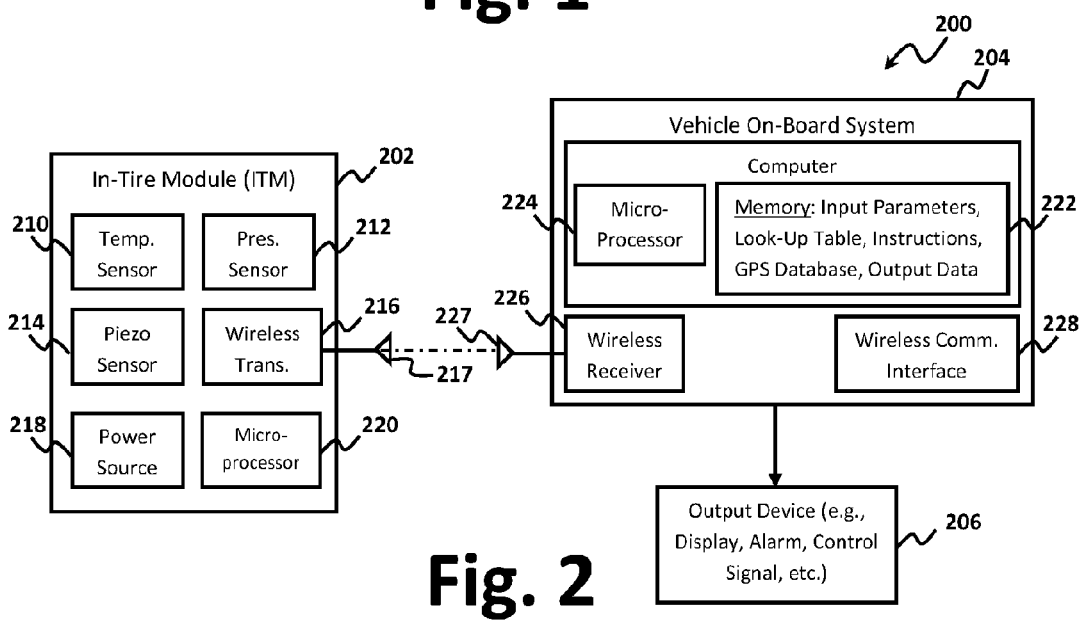
FIG. 2 illustrates an exemplary tire analysis system in accordance with the presently disclosed technology, including both hardware and software components thereof.

An example of a hardware device used to measure the tire parameters identified in step 104 is represented in FIG. 2 as in-tire module (ITM) 202. ITM 202 generally includes a piezoelectric sensor 214 used to obtain the voltage output signals while a sensor is operating in the counter-deflection zone, and may contain one or more distinct piezoelectric elements. Additional sensors may also be provided in ITM 202, such as but not limited to optional pressure sensor 212 and optional temperature sensor 210. Temperature and pressure may be useful when determining other parameters than tire uniformity such as tire load and the like. Additional aspects of exemplary apparatuses used to measure various tire parameters are discussed later with reference to FIGS. 3 and 4.

In some embodiments of the method 100 of FIG. 1, a tire may include multiple piezoelectric sensors each having one or more piezoelectric elements. In particular, some exemplary embodiments may include at least two piezoelectric sensors in each tire, wherein the at least two piezoelectric sensors are separated circumferentially by about 180 degrees so that at least one piezoelectric sensor is operating in the counter-deflection zone at a time. In another exemplary embodiment, three piezoelectric sensors are included in each tire, wherein the three piezoelectric sensors are separated circumferentially by about 120 degrees. In a still further exemplary embodiment, four piezoelectric sensors are included in each tire, wherein the four piezoelectric sensors are separated circumferentially by about 90 degrees. In still further embodiments, multiple sensors are provided that are not necessarily uniformly spaced. Additionally or alternatively, each piezoelectric sensor may itself include multiple piezoelectric elements such that multiple piezoelectric output signals are monitored in step 104 for each rotation of a tire.

When multiple piezoelectric sensors are provided in each tire, method 100 includes an additional step 106 of correlating the piezoelectric output signals obtained from each piezoelectric element. This correlation from step 106 may be done by time-shifting selected piezoelectric output signals such that they can each be analyzed relative to one another on an appropriate time scale. Ultimately, step 108 then involves electronically determining actual tire uniformity parameter values by applying the measured and correlated piezoelectric output signal voltage change levels from steps 104 and 106 to the established transfer function from step 102. One or more of steps 102-108, respectively, may occur within the ITM 202 (e.g., within microprocessor 220) or may be determined within processing components of a vehicle on-board system 204 or another remote location after being relayed from ITM 202. The determined tire uniformity parameter values may then be provided as electronic output to a user.

Referring now to FIG. 2, additional details are now presented relating to an exemplary system for implementing the above-described features and steps associated with determining tire uniformity parameters based on piezoelectric sensor outputs obtained while the tire sensors are operating in the tire's counter-deflection zone. In general, such system 200 may include three types of components, namely an in-tire module (ITM) 202, a vehicle on-board system (VOS) 204 and an output device 206. Although only one ITM 202 is shown in FIG. 2, it should be appreciated that a plurality of ITMs (e.g., two or more spaced ITMs 202 per tire in a vehicle) may be used such that information about multiple tires is transferred to a vehicle on-board system 204 or some other central location. Similarly, although only one output device 206 is illustrated, multiple output devices (e.g., one tire parameter monitor light for each tire in a vehicle or multiple types of output devices such as displays, alarms, control signals, etc.) may be employed.

Referring now to the in-tire module (ITM) component 202 of FIG. 2, such device may generally include a plurality of different sensors (e.g., temperature sensor 210, pressure sensor 212, and/or piezoelectric sensor 214), a microprocessor 220 for coordinating the data received from such sensors, a transceiver 216 and associated antenna 217 for wirelessly transmitting information from ITM 202 to a remote location and a power source 218 for providing operational energy to the various electronic components within ITM 202. The piezoelectric sensor 214 preferably includes one or more piezoelectric elements that are configured to generate electric charge when a portion of the tire to which such piezoelectric element(s) is integrated is subjected to mechanical deformation. The electrical output of the piezoelectric sensor 214 may correspond to a continuous signal of the electrical charge output of the piezoelectric element(s), thus indicating when the tire is subjected to increased loading levels. For example, as will be discussed herein, it is possible to capture and analyze the continuous raw output signal of a piezoelectric sensor 214 in order to analyze selected portions of the signal while each sensor is in the counter-deflection zone.

Referring now to Vehicle On-Board System 204, such system preferably includes a wireless receiver or transceiver 226 and associated antenna 227 which is in wireless communication with one or more ITMs in a vehicle. In some embodiments, two or more ITMs 202 are provided in each vehicle tire such that VOS 204 receives information from each tire. By encoding different tires with different identification tags and/or using known communication algorithms for coordinated communication among the different ITMs, tire-specific data can be identified and potential signal interference among multiple ITMs can be addressed. Additional wireless communication between the VOS 204 and locations other than ITMs 202 can be accommodated by a wireless communication interface 228. Wireless communication interface 228 may be capable of linking VOS 204 with a central computer for vehicle tracking, or to emergency providers or other entities using a cellular device, air-card or the like. The wireless link between antennas 217 and 227 and/or the wireless link between wireless communications interface 228 and another remote location can use a variety of different communication protocols, including but not limited to cellular or RF based transmissions, and/or particular standards such as Bluetooth, Zigbee, and WiFi protocols and others.

VOS 204 also may include a microprocessor 224 and associated memory 222 for implementing many of the software based electronic calculations and determinations described herein. Computing/processor device 224 may be adapted to operate as a special-purpose machine by executing the software instructions rendered in a computer-readable form stored in memory/media element 222. When software is used, any suitable programming, scripting, or other type of language or combinations of languages may be used to implement the teachings contained herein. In other embodiments, the methods disclosed herein may alternatively be implemented by hard-wired logic or other circuitry, including, but not limited to application-specific circuits. Although only one memory element 222 is shown in FIG. 2, it should be appreciated that any number of memory or media elements may be included to store software instructions, data variables and the like. The various memory/media elements may be provided as a single or multiple portions of one or more varieties of tangible computer-readable media, such as but not limited to any combination of volatile memory (e.g., random access memory (RAM, such as DRAM, SRAM, etc.) and nonvolatile memory (e.g., ROM, flash, hard drives, magnetic tapes, CD-ROM, DVD-ROM, etc.) or any other memory devices including diskettes, drives, other magnetic-based storage media, optical storage media and others.

Referring now to output device 206, it should be appreciated that the determined output parameters, particularly tire uniformity values determined in accordance with the present technology, may be relayed to output device 206 for meaningful electronic communication with a vehicle occupant, central control station, or other entity. In some examples, output device 206 corresponds to a monitor or other visual display within the vehicle, a sensor or alarm, or other device capable of generating an audio and/or visual representation of the specific tire load value or comparison of the tire load to some threshold level(s). In other examples, output devices such as printers or controllers also may be employed.

Figure 3:
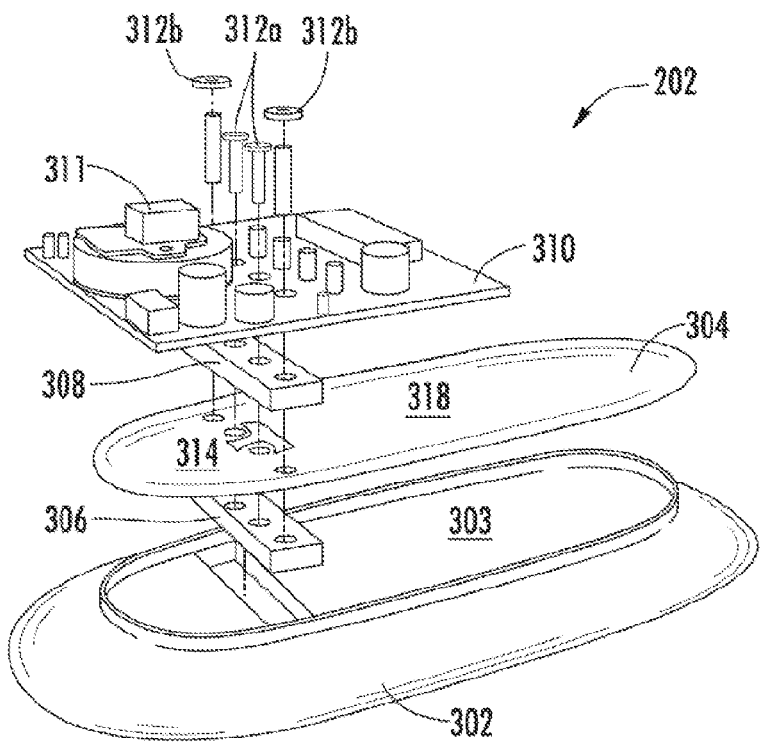
FIG. 3 illustrates a perspective view of an exemplary in-tire module (ITM) for use in a tire analysis system of the present technology.

Referring now to FIG. 3, more particular structural details of an exemplary ITM are now presented. In one exemplary embodiment, ITM 202 includes such structural elements as a support patch 302, a piezoelectric patch 304, first and second spacer bars 306 and 308, an electronics substrate 310 and a plurality of electromechanical connections 312.

The support patch 302 may correspond to a substantially planar portion of rubber or other elastomeric material. Support patch 302 offers modular structure for ITM 202 and also provides a base for suitable integration with the interior surface of a tire. For example, the support patch 302 may be attached to or integrated with or embedded on the inner surface or inner liner of a tire using adhesives, curing techniques, or other suitable means. Although ITM 202 may be positioned at a variety of locations within the tire where the piezoelectric elements will be subjected to various tire stress levels, some examples use a mounting location of ITM 202 in the center of the tire crown, i.e., along a lateral centerline of the tire width. Support patch 302 along with piezoelectric pack 304 may be formed with surfaces having minimized curvatures to help avoid local fatigue within an ITM 202.

Piezoelectric pack 304 may correspond to a substrate surface on which one or more piezoelectric elements are formed. In one example, a first piezoelectric element 314 formed on the substrate surface of piezoelectric pack 304 is provided to function as piezoelectric sensor 214, while a second piezoelectric element 318 is formed on the substrate surface of piezoelectric pack 304 to function as power source 218. The electric current generated by such second piezoelectric element 318 may be conditioned and stored within a rechargeable battery, capacitor or other energy source, which then can be coupled to such electronic components as temperature sensor 210, pressure sensor 212, microprocessor 220, and/or transceiver 216 to supply operating power thereto.

First and second piezoelectric elements 314 and 318 may correspond to a variety of piezoelectric structures, including but not limited to piezoelectric crystals, composite fiber structures, piezoceramic modules, or other devices made out of piezoelectric material. The piezoelectric material used in such elements may include one or more of berlinite, quartz, topaz, tourmaline-group minerals, dentin, gallium orthophosphate, langasite, barium titanate, lead titanate, lead zirconate titanate (PZT), potassium niobate, lithium niobate, lithium tantalite, sodium tungstate, sodium potassium niobate, bismuth ferrite, sodium niobate, and polyvinylidene fluoride (PVDF). In some specific embodiments, each piezoelectric element is formed from a single layer of piezoceramic material sandwiched between opposing layers of electrode material (e.g., a conductive material such as copper, nickel, gold, silver, aluminum or the like.) The multiple piezoelectric elements may all be encased in an additional protective material, such as a thin casing of fiberglass on the top and bottom of the piezoelectric elements.

In some embodiments, the second piezoelectric element 318 used for power generation is larger than the first piezoelectric element 314 used as a sensor. In some embodiments, the size of and materials used in the second piezoelectric element 318 are chosen to yield an independent power element capable of providing at least 100 µJ/cycle of electric energy during tire operation. In general, it is particularly advantageous to include two separate piezoelectric elements so that the piezoelectric element used for obtaining a counter-deflection signal and other sensor-based information can be independent and avoid interference caused by simultaneous energy harvesting on the same piezoelectric element. Such interference can be particularly unpredictable based on unpredictable charge states of an energy storage device associated with the piezoelectric energy harvesting components. As such, separation of piezoelectric elements has resulted in enhanced signal quality and improved sensor results.

Figure 4:
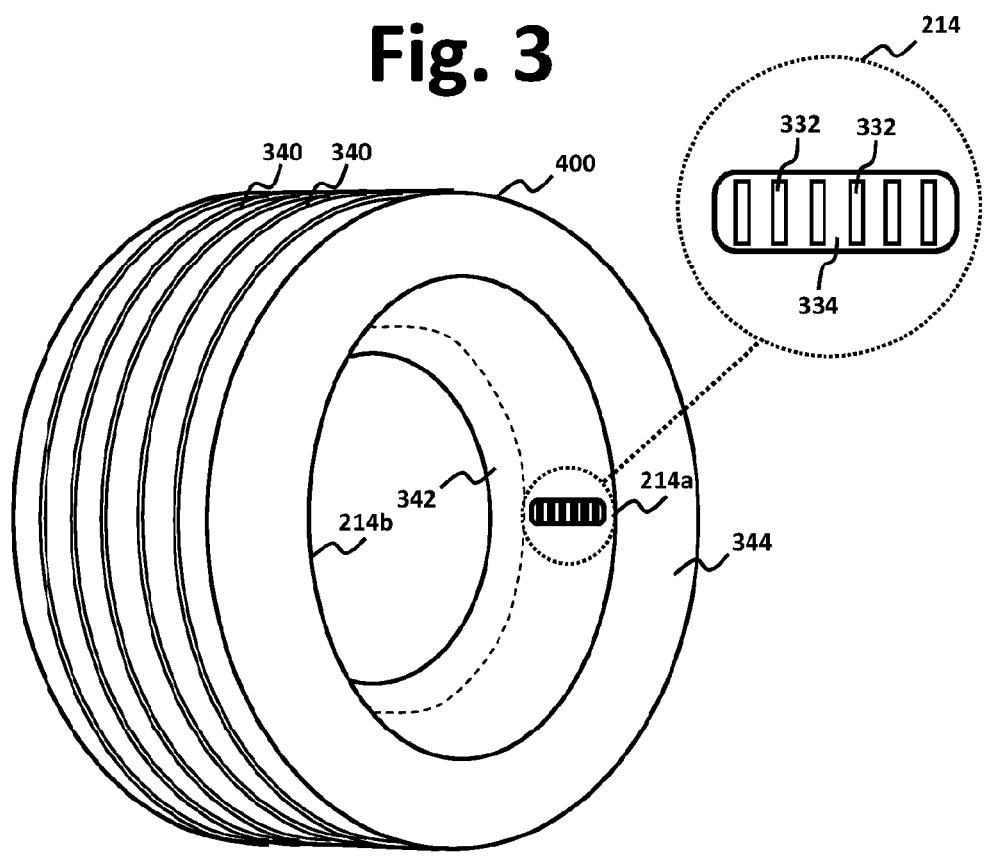
FIG. 4 illustrates an exemplary multi-element piezoelectric sensor for use in an in-tire module (ITM) in accordance with the presently disclosed technology.

Referring now to FIG. 4, it should be appreciated that some embodiments of piezoelectric sensor 214 may include a plurality of piezoelectric elements 332. For ease of illustration, FIG. 4 shows only the piezoelectric sensor portion 214 of an ITM 202, both in its ultimate location relative to the interior surface of a tire 400, and also in an isolated magnified view. In addition, two piezoelectric sensors 214a and 214b are illustrated and separated by a spacing of about 180 degrees relative to one another. More piezoelectric sensors in the same or different spaced locations within a tire may also be provided.

Referring still to FIG. 4, the plurality of piezoelectric elements 332 in each sensor 214 are arranged in a substantially linear array on a substrate 334. The mounting location of the piezoelectric sensor 214 within a tire 400 may be such that the linear arrangement of piezoelectric elements stretches laterally, or transverse, along the interior surface of the tire crown from a location towards a first sidewall 342 of tire 400 to a location towards a second sidewall 344. In some embodiments, the piezoelectric sensor is centered along the crown of the tire. Although six piezoelectric elements 332 are shown in FIG. 4, it should be appreciated that any number of piezoelectric elements may be provided, for example a number of piezoelectric elements within a range from between two to ten (2-10).

In some embodiments, one or more piezoelectric elements 332 are provided to match up with selected tread ribs 340 or other tread features, such that tire non-uniformities experienced by each tread rib or tread feature within the entire counter-deflection zone area can be determined. In some embodiments, piezoelectric sensor 214 is configured such that one piezoelectric element 332 is positioned on the interior surface of a tire underneath each respective tread rib or feature provided along a portion of the tire exterior. In other embodiments, piezoelectric elements 332 are provided at every other tread rib/feature or at other selected combinations of tread ribs/features. In still further embodiments, piezoelectric elements 332 are provided at spaced intervals having some predetermined distance from adjacent piezoelectric elements. In other embodiments, the piezoelectric elements may be configured in non-linear arrays or matrix configurations (e.g., 2×2, 2×3, 2×6, 3×9, etc.) It should be appreciated that predetermined locations and spacing for such piezoelectric elements 332 may be associated with tread ribs or features provided within the tire crown portion, within the tire sidewall portions, or a combination of both crown and sidewall locations.

By providing multiple piezoelectric elements, more information about the tire's parameters while each sensor is operating in the counter-deflection zone is obtainable. This combination of multiple contact-deflection zone signals provides sufficient information to be representative of tire uniformity throughout a greater cross-section of the tire since such parameters may vary laterally. As such, it can sometimes provide a more detailed and accurate representation of the tire curvature and related forces in order to more effectively determine the tire uniformity characteristics for a tire.

Figure 7:
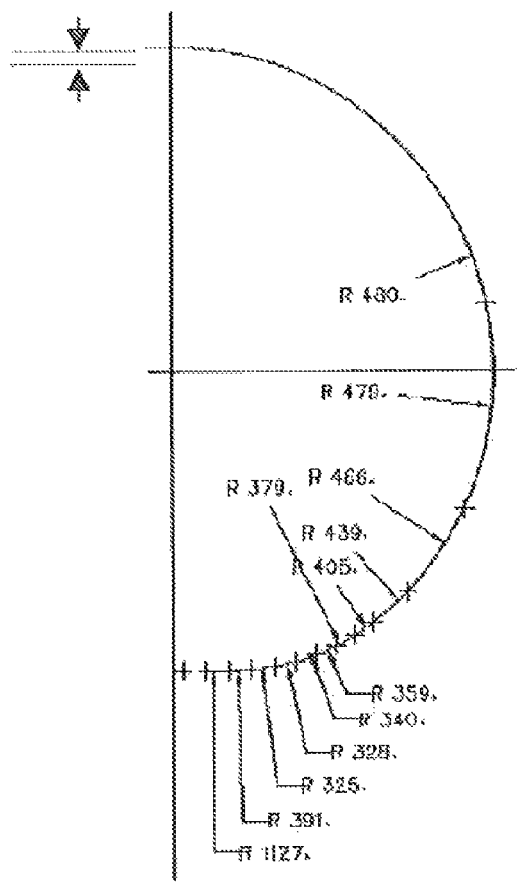
FIG. 7 provides an exemplary graphical representation of a tire uniformity parameter measured in accordance with the disclosed technology around a partial circumference of a tire.
Figure 8:
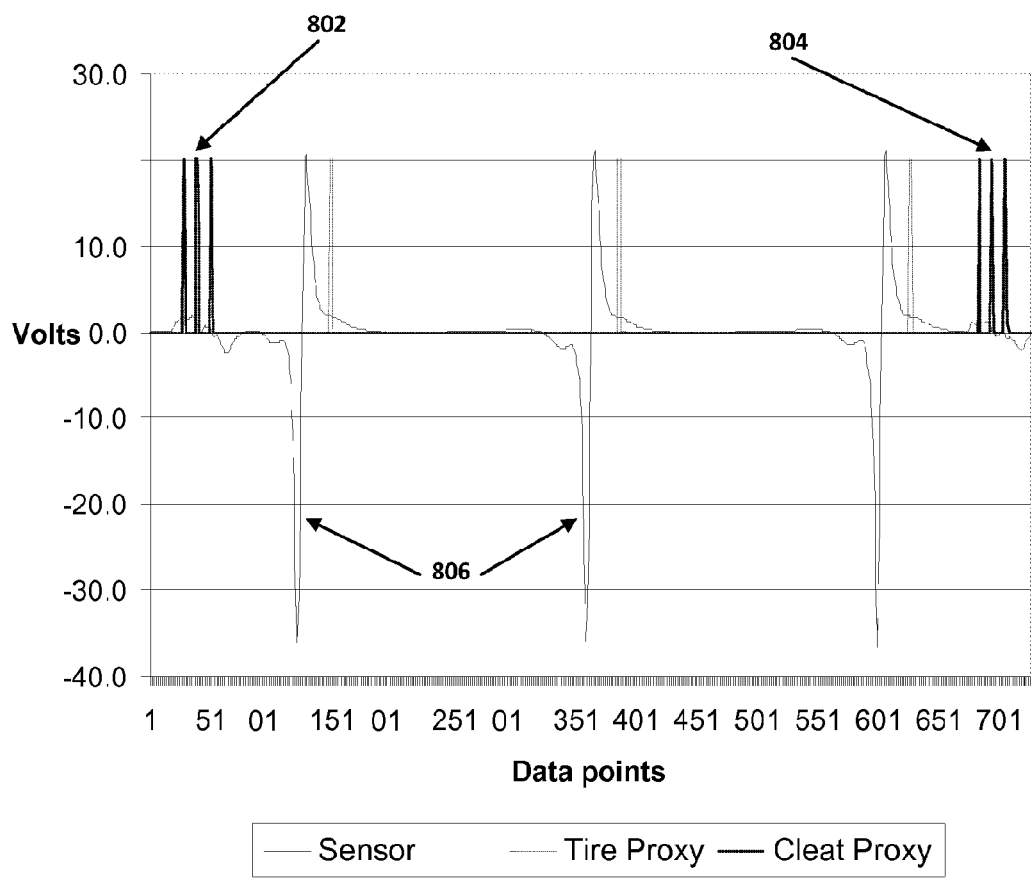
FIG. 8 provides an exemplary graphical representation of a piezoelectric output signal illustrating measured strain in the counter-deflection zone due to cleats in the contact patch of a moving tire.
Figure 9:
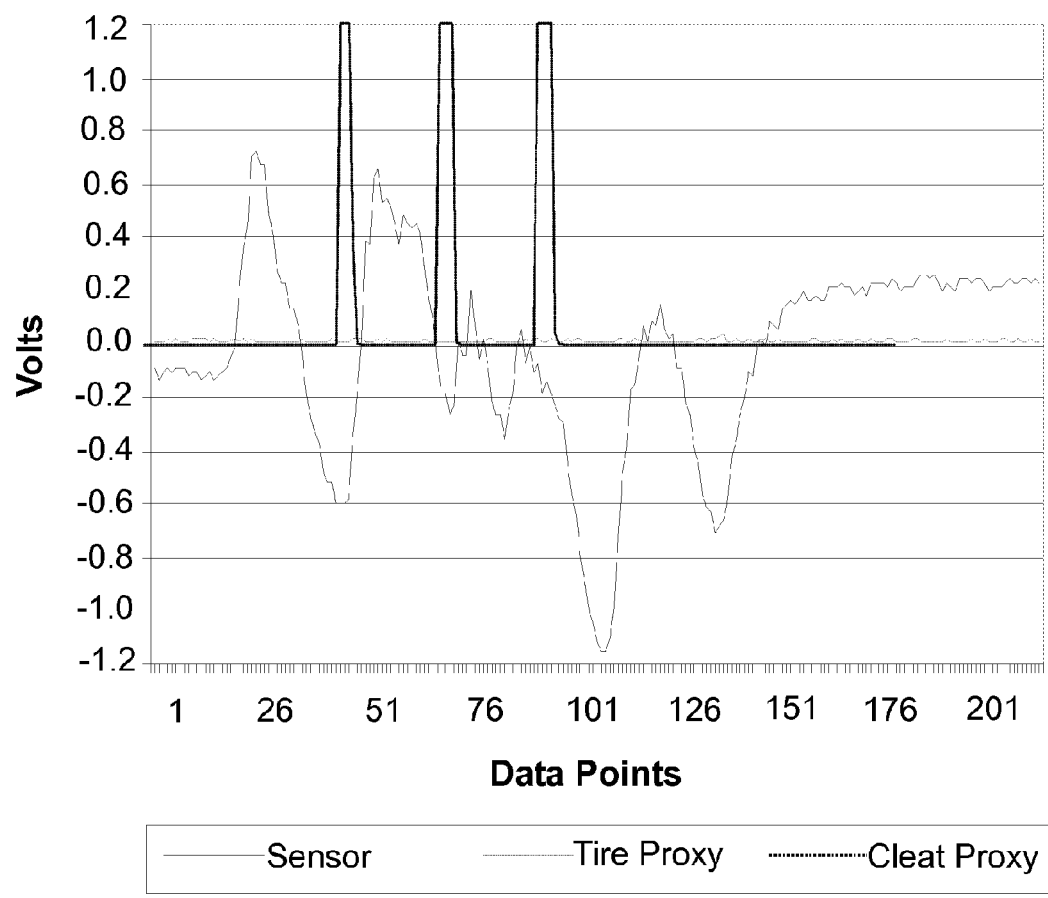
FIG. 9 provides a magnified view of the counter-deflection zone portion of the graphical representation of FIG. 8.

Additional details regarding the output of each piezoelectric element used in the disclosed technology, particularly the piezoelectric element used as a sensor for monitoring voltage output levels while the sensor is operating in the counter-deflection zone are now presented with respect to FIGS. 7-9, respectively. The piezoelectric element used as a sensor in the disclosed technology generates a voltage proportional to the time-varying shape of the tire where it is attached. When the tire is rolling, the rate of change of the piezoelectric stress is greatest where the tire curvature change is greatest, namely at the leading and trailing edges of the contact patch. The voltage signal corresponding to this time-varying stress is positive or negative depending on the particular polarization of the piezoelectric material. Regardless of polarity, the raw piezoelectric output signal will exhibit a reversal of voltage rate correlating to the reversal of the time-varying applied stress exerted at the piezoelectric element. For example, if tensile stress within the piezoelectric material generates a positive voltage, then the release of that tensile stress or application of compressive stress along the same axis would generate a negative voltage.

FIG. 7 illustrates the local circumferential radius of curvature (measured in millimeters—mm) for a nominally loaded 275/80R22.5 tire. Counter-deflection is customarily the measure of the change in radius along the rolling axis 180 degrees from contact center corresponding to a given tire load and pressure. In the present application, the cdZone of a given piezoelectric sensor is anywhere outside the direct influence of contact patch deformations. This includes the area outside the contact patch including the contact patch entry and exit points.

When the tire's load changes in time, there is a necessary change in counter-deflection. For example, a tire rolling over a cleat experiences a momentary increase in the tire load, thus affecting the time-signature of the cdZone shape as observed from a piezoelectric output signal. A piezoelectric sensor is sensitive enough to detect this cdZone shape change for quite small load perturbations. Because cdZone signals for a rolling tire are typically on the order of about five percent (5%) or less of the cpZone edge signal amplitudes (occurring at contact patch entry and exit points), this helps to discriminate perturbations occurring in the cdZone from other signal sources.

The counter-deflection signal when the tire is rolling contains several insights into the tire's behavior. FIG. 8 shows the signal from a single piezoelectric sensor mounted in the center of the crown of an exemplary test tire while the test tire is moderately loaded and running at a relatively slow constant speed against a road-wheel. It should be appreciated that when a perfectly uniform tire is rolling perfectly smoothly, the counter-deflection signal reflects essentially a case of static tire loading. This static loading is evident in the two middle tire rotations 806 of FIG. 8 without cleats. When cleats are present in a tire revolution, the counter-deflection signal shows voltage spikes such as seen in signal portions 802 and 804. Although FIG. 8 illustrates the raw piezoelectric output signal that may be used for the disclosed signal analysis, it should be appreciated that analysis may alternatively be performed on a derivative of the raw piezoelectric output signal (e.g., the first or second derivative of the raw output signal).

The road-wheel used to generate the signal of FIG. 8 was equipped with three small cleats. The cleat positions (road-wheel azimuth) and the tire azimuth were recorded simultaneously by proximity detectors. The time or distance between cleat proxy groups (the dotted line in FIG. 8) represents the road-wheel circumference. The time or distance between tire proxy signals (the dashed trace in FIG. 8) is the tire's effective rolling circumference. The solid line in FIG. 8 is the raw piezoelectric output signal captured along with the proxy signals by a recording oscilloscope.

The counter-deflection example and resultant signal of FIG. 8 is somewhat complicated by the total spacing of the three cleats being approximately equal to the contact patch length (cpLength), which is more evident from the magnified view in FIG. 9. In some instances, the piezoelectric signal can be annihilated by falling between or near cleats in the contact patch, thus trapping tire shape and limiting its change. Even a single cleat with the piezoelectric signal falling adjacent can annihilate the output signal. Because of potential concerns with this issue, some embodiments of the subject analysis may choose to exclude the contact area around contact patch entry and exit points for signal analysis.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method, comprising:
   electronically establishing a transfer function relating a tire uniformity parameter to a piezoelectric output signal for a given tire;
   monitoring the piezoelectric output signal from two or more piezoelectric tire sensors to measure the voltage change from each piezoelectric tire sensor while it is operating in a counter-deflection zone, wherein the counter-deflection zone comprises an area of the tire that is not in contact with a ground surface;
   correlating the piezoelectric output signals from each one of the two or more piezoelectric tire sensors;
   electronically determining the actual tire uniformity parameter value by applying the measured and correlated piezoelectric output signal voltage change levels to the established transfer function; and
   providing the actual tire uniformity parameter value as electronic output.

2. The method of claim 1, wherein said step of electronically establishing a transfer function comprises relating a tire uniformity parameter as a function of azimuth to the voltage change from a piezoelectric output signal for a given tire having a known rotational speed.

3. The method of claim 1, wherein the two or more piezoelectric tire sensors are uniformly spaced around the circumference of the given tire such that at least one piezoelectric tire sensor is operating in the counter-deflection zone at a time.

4. The method of claim 1, wherein the tire uniformity parameter comprises one or more of tire force variation, tire stiffness, tire thickness variation, and radial run out.

5. The method of claim 1, wherein the time during which each piezoelectric tire sensor is operating in the counter-deflection zone is determined as the time difference between a given contact patch exit time and the contact patch entry time for the next tire revolution.

6. The method of claim 5, wherein the contact patch exit time and contact patch entry time are determined by identifying zero crossings of the second derivative of the raw signal obtained from the piezoelectric sensor.

7. The method of claim 1, further comprising a step of transmitting the piezoelectric output signals to a location remote from the tire before said step of electronically determining the actual tire uniformity parameter value.

8. The method of claim 1, further comprising a step of providing operational power for various electronic components within the tire from a separate piezoelectric element than the two or more piezoelectric tire sensors.

* * * * *